United States Patent
Brauer et al.

(10) Patent No.: US 6,884,028 B2
(45) Date of Patent: Apr. 26, 2005

(54) TURBOMACHINERY BLADE RETENTION SYSTEM

(75) Inventors: John Christopher Brauer, Lawrenceburg, IN (US); Kenneth Martin Lewis, Mason, OH (US); Fred Martin Heise, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 94 days.

(21) Appl. No.: 10/261,072

(22) Filed: Sep. 30, 2002

(65) Prior Publication Data

US 2004/0062643 A1 Apr. 1, 2004

(51) Int. Cl.$^7$ .............................. F01D 11/00; F01D 5/30
(52) U.S. Cl. .............................. 415/173.7; 416/220 R; 416/221
(58) Field of Search .................. 415/173.7; 416/220 R, 416/221

(56) References Cited

U.S. PATENT DOCUMENTS

| | | | |
|---|---|---|---|
| 3,768,924 A | * 10/1973 | Corsmeier et al. ...... | 416/220 R |
| 4,033,705 A | * 7/1977 | Luebering ............... | 416/220 R |
| 4,171,930 A | 10/1979 | Brisken et al. .......... | 416/220 R |
| 4,192,633 A | 3/1980 | Herzner ................... | 416/221 |
| 4,480,958 A | 11/1984 | Schlechtweg | |
| 4,890,981 A | 1/1990 | Corsmeier et al. ...... | 416/220 R |
| 5,169,289 A | * 12/1992 | Lalanne .................. | 416/220 R |
| 5,257,909 A | 11/1993 | Glynn et al. ............. | 416/220 R |
| 5,281,097 A | 1/1994 | Wilson et al. ........... | 416/220 R |
| 5,338,154 A | * 8/1994 | Meade et al. ............ | 415/173.7 |
| 5,622,475 A | 4/1997 | Hayner et al. | |
| 5,630,703 A | 5/1997 | Hendley et al. ......... | 416/220 R |
| 5,735,671 A | 4/1998 | Brauer et al. | |
| 6,520,743 B2 | * 2/2003 | Arilla et al. ............. | 416/220 R |

* cited by examiner

*Primary Examiner*—Thai-Ba Trieu
(74) *Attorney, Agent, or Firm*—Adams Evans P.A.; William Scott Andes

(57) ABSTRACT

A blade retention assembly is provided that comprises: a disk, a plurality of blades, each having a dovetail disposed in one of an array of slots formed in the outer periphery of the disk, an annular inner retainer attached to the disk, and a plurality of arcuate blade retainers, the blade retainers being secured to the inner retainer by a hooked rabbet joint. A blade retainer is also provided, comprising an arcuate body having a planar inner face having an arcuate depression formed therein defining a sealing lip, and an aft face disposed opposite the inner face which has an arcuate rim formed therein.

11 Claims, 3 Drawing Sheets

TURBOMACHINERY BLADE RETENTION SYSTEM

STATEMENT REGARDING FEDERALLY SPONSORED RESEARCH & DEVELOPMENT

The U.S. Government may have certain rights in this invention pursuant to contract number NAS3-98004 awarded by the National Aeronautics and Space Administration.

BACKGROUND OF THE INVENTION

This invention relates generally to gas turbine engine rotor assemblies and more particularly to a blade retention system for a gas turbine engine rotor assembly.

A gas turbine engine includes a compressor that provides pressurized air to a combustor wherein the air is mixed with fuel and ignited for generating hot combustion gases. These gases flow downstream to one or more turbines that extract energy therefrom to power the compressor and provide useful work such as powering an aircraft in flight. In a turbofan engine, which typically includes a fan placed at the front of the core engine, a high pressure turbine powers the compressor of the core engine. A low pressure turbine is disposed downstream from the high pressure turbine for powering the fan. Each turbine stage commonly includes a stationary turbine nozzle followed in turn by a turbine rotor.

A turbine rotor comprises a row of rotor blades mounted to the perimeter of a rotor disk that rotates about the centerline axis of the engine. Each rotor blade typically includes a shank portion having a dovetail for mounting the blade to the rotor disk and an airfoil that extracts useful work from the hot gases exiting the combustor. A blade platform, formed at the junction of the airfoil and the shank portion, defines the radially inner boundary for the hot gas stream. The turbine nozzles are usually segmented around the circumference thereof to accommodate thermal expansion. Each nozzle segment has one or more nozzle vanes disposed between inner and outer bands for channeling the hot gas stream into the turbine rotor.

To improve turbine engine performance, flowpath temperatures and blade tip speeds are increased. These conditions increase centrifugal loads and metal temperatures, requiring robust turbine blade and blade retainer designs. Rotor cavities are shielded from flowpath temperatures by overlap seals, formed by a combination of sealing flanges, often referred to as "angel wings", which are mounted on the blades, blade retainers, or stator. This configuration isolates flowpath gas ingestion to one or more buffer cavities. Hotter flowpath temperatures require improved sealing of turbine rotor purge cavities. However, overlap seals become more difficult to design as centrifugal loads and temperatures increase. Prior art sealing configurations typically use either a single or double overlap angel wing arrangement, using 360 degree or segmented sealing components for the rotor and stator.

When buffer cavity temperatures exceed the temperature capabilities of forged superalloy materials, cast segmented arcuate retainers are often used to replace the outer most portion of blade retainers. These segmented retainers or "chicklets" have typically been constrained radially with dovetails, similar to the manner in which turbine blades are retained in the rotor. Dovetailed chicklets are challenging to design, especially for single tang blades, and relatively costly to manufacture. Flowpath gas leakage also occurs through the gaps between adjacent retainers.

Accordingly, there is a need for an improved blade retainer system.

BRIEF SUMMARY OF THE INVENTION

The above-mentioned need is met by the present invention, which provides, in one aspect, a blade retention assembly that comprises: a disk, a plurality of blades, each having a dovetail disposed in one of an array of slots formed in the outer periphery of the disk, an annular inner retainer attached to the disk, and a plurality of arcuate blade retainers, the blade retainers being secured to the inner retainer by a hooked rabbet joint. In another aspect, the present invention provides a blade retainer comprising an arcuate body having a planar inner face having an arcuate depression formed therein defining a sealing lip, and an aft face disposed opposite the inner face which has an arcuate rim formed therein.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
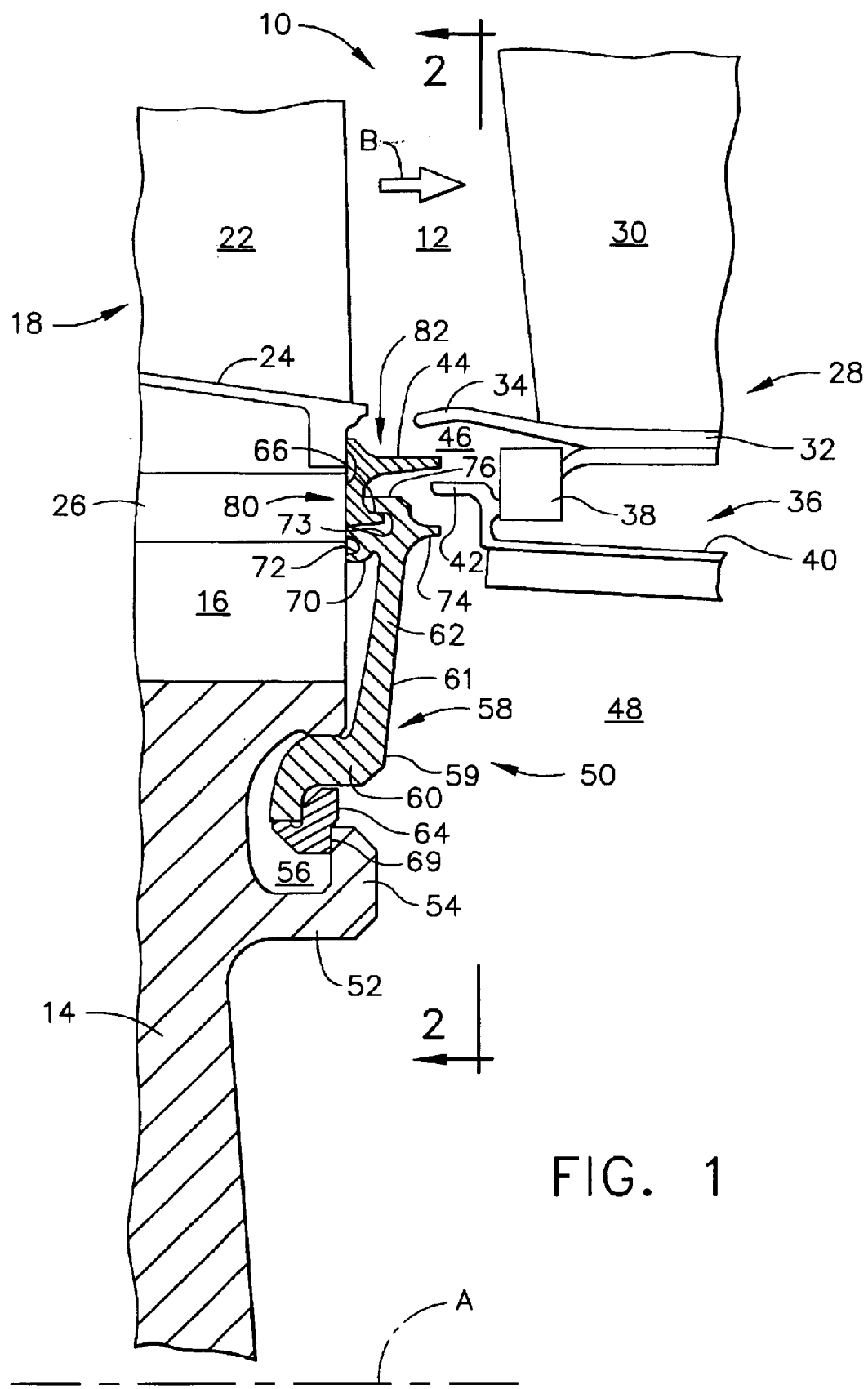
FIG. 1 is a schematic cross-sectional view of a portion of a turbine section of a gas turbine engine constructed in accordance with the present invention.

Referring to the drawings wherein identical reference numerals denote the same elements throughout the various views, FIG. 1 shows a fragmentary cross-sectional view of a turbine rotor assembly 10 of a gas turbine engine which is disposed about a longitudinal axis labeled A. Although a high pressure turbine rotor is shown, the blade retention design of the present invention is equally applicable to other assemblies, such as low pressure turbine rotors or compressor rotors. Combustion gases pass through the flowpath 12 of the rotor assembly 10, generally in the direction of the arrow labeled B. The rotor assembly 10 includes an annular disk 14. The disk 14 has alternating dovetail slots 16 and dovetail posts 20 (see FIG. 2) around its rim. The dovetail slots 16 receive a plurality of turbine blades 18. Each turbine blade 18 comprises an airfoil 22, a platform 24, and a shank 26 which is formed into a dovetail shape complementary to that of the dovetail slot 16. A stator (or nozzle) assembly 28 for the subsequent turbine stage is disposed axially rearward of the disk 14. The stator assembly 28 comprises a plurality of airfoils 30 (also referred to as nozzle vanes) which are attached to a circumferentially extending inner band 32. The inner band 32 has an annular first stationary sealing flange 34 that extends axially forward towards the disk 14. The term "sealing flange" refers to an annular flange or extension intended to cooperate with another similar extension to form an overlapping seal. This type of flange or extension is commonly referred to in the turbomachinery art as an "angel wing". A stationary seal 36, such as a conventional honeycomb seal, is attached to the inner band 32, for example with a hanger 38. The stationary seal 36 has a backing plate 40 which includes an annular second stationary sealing flange 42 which is positioned radially inward of the first stationary sealing flange 34, and which extends axially towards the disk 14. The first and second stationary sealing flanges 32 and 36 and a blade retainer sealing flange 44 (described below) are positioned with respect to each other so as to define a buffer cavity 46 between the combustion gas flowpath 12 and the rotor cavity 48. This arrangement reduces leakage of combustion gases from the flowpath 12 to the rotor cavity 48.

Considering the disk 14 in more detail, the turbine blades 18 are restrained axially in the dovetail slots 16 of the disk 14 by a retainer assembly 50 which is attached to the disk 14. A portion of the disk 14 is formed into a circumferential hook 52, which includes a radially extending flange 54. An annular cavity 56 is defined between the flange 54 of the circumferential hook 52 and the remainder of the disk 14.

An annular inner retainer 58 is attached to the disk 14. The inner retainer 58 is a generally disk-shaped component which has a radially inner portion 59 that includes an axially extending, generally cylindrical hub 60 and a radially outer portion 61 that defined a radially extending arm 62. The axially extending hub 60 is received in the cavity 58 of the disk 14. A retaining ring 64, such as a conventional split ring, is installed in the cavity 58. The retaining ring 64 bears against an axially facing bearing surface 69, which is part of the flange 54 of the circumferential hook 52, to prevent axially rearward movement of the inner retainer 58.

A forward facing seal wire boss 70 may be disposed at the radially outer end of the arm 62. The seal wire boss 70 has a circumferential groove 72 which accepts a conventional sealing wire (not shown) in a known manner. An annular aft flange 74 extends axially rearward from the arm 62. The aft flange 74 acts as a discourager seal to direct any purge flow leakage from the rotor cavity 48 axially rearward, and also causes the inner retainer 58 to put an axially forward force on the blade retainers 82 (described below) under centrifugal loading. An annular hook 76 is disposed at the radially outer edge of the inner retainer 58. The annular hook 76 extends axially forward end defines an annular gap 73. The annular hook 76 forms one-half of a hooked rabbet joint 60.

A plurality of blade retainers 82 are disposed against the aft surfaces 84 of the blades 18. Each blade retainer 82 is generally arcuate in shape and includes a planar inner face 86 opposite an outer face 88. The blade retainers 82 are secured in the axial and radial directions by the inner retainer 58. Each or the retainers includes an annular blade retainer sealing flange 44 which extends axially rearward towards the stator assembly 28, and a circumferential rim 66 which is located radially inward of the retainer sealing flange 44 and which also extends axially rearward. The rim 66 forms the second half of the hooked rabbet joint 80 and is received in the annular gap 73 so as to engage the annular hook 76 of the inner retainer 58.

Figure 4:
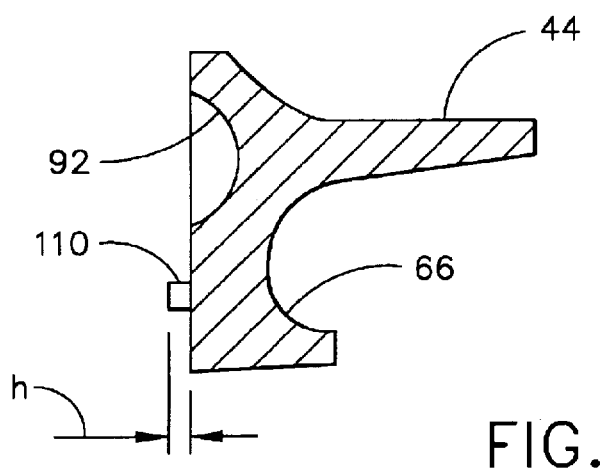
FIG. 4 is a cross-sectional view taken along lines 4—4 of FIG. 3.

FIG. 4 shows a exemplary blade retainer 82 in more detail. Each blade retainer 82 is a single piece which may be cast or machined from any suitable material having adequate strength at the expected operating temperatures. For a high pressure turbine rotor, examples of suitable materials would include nickel- or cobalt-based superalloys. A pocket 92 may be optionally formed into the planar inner face 86, for example by casting or by machining. The purpose of the pocket 92 is to reduce the mass of the blade retainer 82 and to create a sealing lip 94, which extends radially up a first circumferential end 96 of the blade retainer 82, circumferentially along a radially outer edge 98 of the blade retainer 82, and radially down a second circumferential end 100 of the blade retainer 82. This sealing lip 94 contacts the aft surfaces 84 of the blades 18. This contact is more in the nature of a line contact than a surface contact, which improves the sealing capability of the blade retainer 82. In the illustrated embodiment the pocket 92 is about 2.5 mm (0.1 in.) deep (measured from the planar inner face 86) and its lateral dimensions are such that the sealing lip 94 has a resulting thickness t of about 1.8 mm (0.07 in.)

Figure 2:
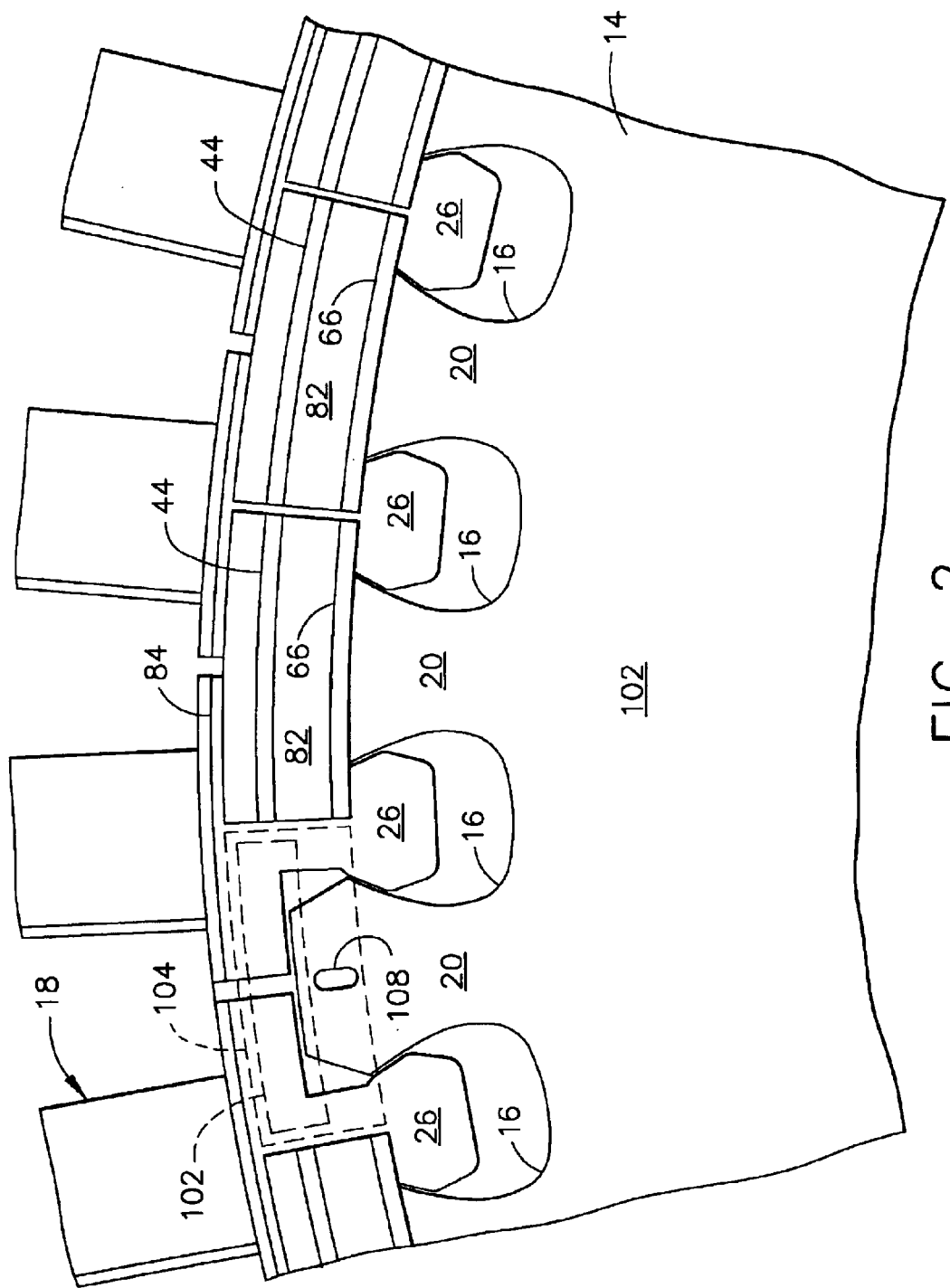
FIG. 2 is a view taken along lines 2—2 of FIG. 1.

FIG. 2 shows a view from the rear looking forward at the disk 14. In this view, the inner retainer 58 and other details have been removed for clarity. The blade retainers 82 are arranged in a circumferential array around the periphery of the disk 14. The planar inner faces 86 of the blade retainers 82 bear against the aft surfaces 84 of the blades 18 and therefore prevent aft axial movement of the blades 18. The outer dashed line 104 in FIG. 2 indicates the outer perimeter of the contact area of one of the blade retainers 82 with the disk 14 and blades 18, while the inner dashed line 102 illustrates the perimeter of the pocket 92. As can be seen, only the relatively thin sealing lip 94 is in contact with the aft surfaces 84 of the blades 18 radially outboard of the radially outer edge of the dovetail posts 20. This makes the sealing function less sensitive to minor variations in the surface profile of the planar inner face 86 of the blade retainer 82, and improves sealing of the gaps between adjacent blades 18 and blade retainers 82.

Figure 3:
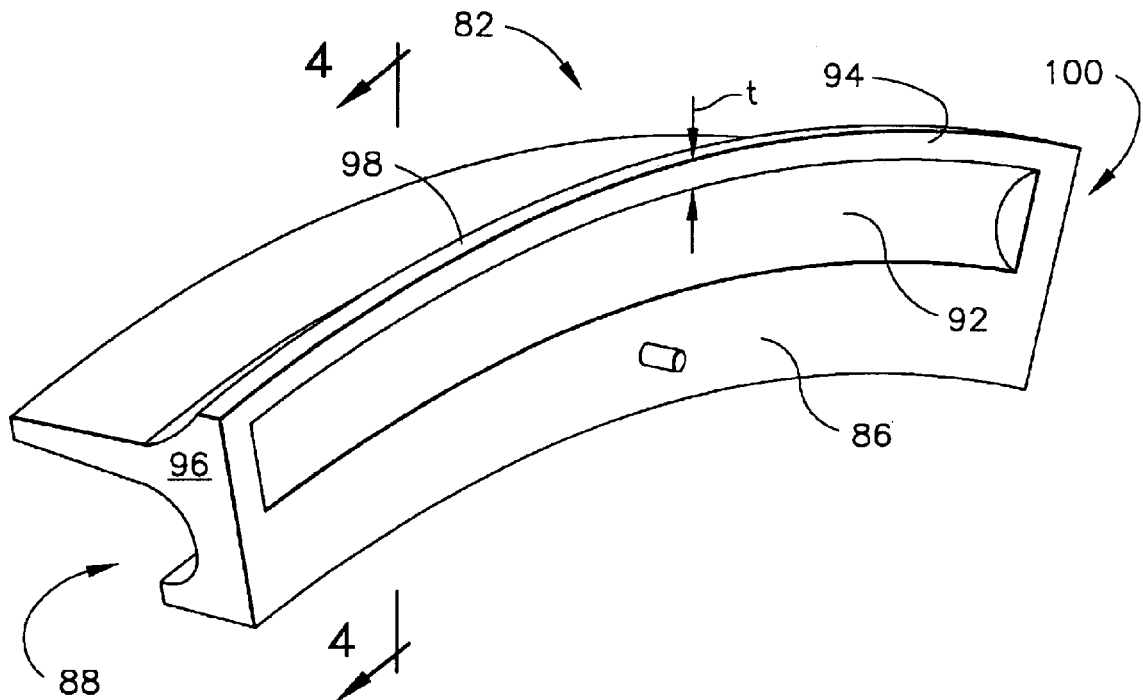
FIG. 3 is a perspective view of a blade retainer for use with the present invention.

The rotor assembly 10 may also include means for aligning the individual blade retainers 82 in the circumferential direction with respect to the disk 14. In the illustrated embodiment, these alignment means take the form of a plurality of shallow recesses 108 formed in the aft surface of the dovetail posts 20 (see FIG. 2), and a plurality of corresponding protrusions 110 disposed on the inner faces 86 of the blade retainers 82 (see FIG. 3). In the illustrated example, the protrusions 110 take the form of generally cylindrical pins. When the rotor assembly 10 is put together, the protrusions 110 are received in the recesses 108 and prevent relative motion between the blade retainers 82 and the disk 14 in a circumferential direction. In the illustrated example the recesses 108 may be about 1.3 mm (0.05 in.) deep from the aft surface of the dovetail posts 20, and the protrusions 110 have a height h of a similar dimension. Other arrangements (not shown) may also be used for aligning the blade retainers 82 circumferentially, for example the disk 14 could include a plurality of protrusions while each blade retainer 82 could include a recess. The circumferential restraints could also be incorporated in other ways. For example, one or more shallow recesses (not shown), similar to those described above, could be formed in the aft surfaces 84 of the blades 18, and corresponding protrusions could be formed on the blade retainers 82.

Although the retainer assembly of the present invention has been described with respect to an aft surface of a rotor assembly, it is noted that the present invention is equally suitable for use with a forward surface of a rotor. That is, it could be used to prevent axially forward motion of a blade.

The foregoing has described a blade retention assembly that comprises: a disk, a plurality of blades, each having a dovetail disposed in one of an array of slots formed in the outer periphery of the disk, an annular inner retainer attached to the disk, and a plurality of arcuate blade retainers, the blade retainers being secured to the inner retainer by a hooked rabbet joint. A blade retainer has also been described, comprising an arcuate body having a planar inner face having an arcuate depression formed therein defining a sealing lip, and an aft face disposed opposite the inner face which has an arcuate rim formed therein. While specific embodiments of the present invention have been described, it will be apparent to those skilled in the art that various modifications thereto can be made without departing from the spirit and scope of the invention as defined in the appended claims.

What is claimed is:

1. A rotor assembly disposed about an axis, comprising:
   a disk having an array of axially extending slots formed in an outer periphery thereof;
   a plurality of blades, each of said blades having a dovetail disposed in one of said slots;
   an annular inner retainer having a radially inner portion and a radially outer portion, said radially inner portion being attached to said disk and said radially outer portion including an annular hook extending axially towards said disk; and
   a plurality of arcuate blade retainers, each of said arcuate blade retainers having an inner face disposed against said blades, and an outer face having a circumferential rim formed therein, wherein said annular hook of said annular inner retainer engages said circumferential rim so as to restrain said arcuate blade retainers in a radial direction.

2. The rotor assembly of claim 1 wherein said radially inner portion of said annular inner retainer is received in an annular cavity formed in said disk.

3. The rotor assembly of claim 2 further including a retainer ring disposed in said annular cavity adjacent said annular inner retainer.

4. The rotor assembly of claim 2 wherein said radially inner portion of said annular inner retainer defines a generally cylindrical, axially extending hub.

5. The rotor assembly of claim 1 wherein each of said arcuate blade retainers includes an annular blade retainer sealing flange extending axially from said outer face thereof.

6. The rotor assembly of claim 1 further comprising means for aligning said arcuate blade retainers in a circumferential direction with respect to said disk.

7. The rotor assembly of claim 6 wherein said means for aligning said arcuate blade retainers in a circumferential direction include a plurality of axially extending protrusions disposed on one of said disk or said arcuate blade retainers, and a plurality of recesses formed in the other of said disk or said arcuate blade retainers.

8. The rotor assembly of claim 6 wherein said means for aligning said arcuate blade retainers in a circumferential direction include an axially extending protrusion disposed on each of said arcuate blade retainers, and a plurality of recesses formed in said disk.

9. The rotor assembly of claim 6 wherein said means for aligning said arcuate blade retainers in a circumferential direction include a plurality of axially extending protrusions disposed on one of said blades or said arcuate blade retainers, and a plurality of recesses formed in the other of said blades or said arcuate blade retainers.

10. A rotor assembly, comprising:
    a disk having an array of axially extending slots formed in an outer periphery thereof; a plurality of blades, each having a dovetail disposed in one at said slots;
    an annular inner retainer having a radially inner portion and a radially outer portion, said radially inner portion being attached to said disk and said radially outer portion including an annular hook extending in axially towards said disk; and
    a plurality of arcuate blade retainers, each of said arcuate blade retainers having an inner face disposed against an axially facing surface of said blades, and an outer face having a circumferential rim and an arcuate blade retainer sealing flange, which extends axially away from said disk, formed therein, said annular hook of said annular inner retainer being engaged with said circumferential rim so to restrain said arcuate blade retainers in a radial direction; and
    a stator assembly which includes an annular axially extending first stationary sealing flange, wherein said first axially stationary sealing flange and said arcuate blade retainer sealing flange are disposed in an axially overlapping relationship.

11. The rotor assembly of claim 10 wherein said stator assembly further includes an annular, axially extending second stationary sealing flange, said second stationary sealing flange being radially spaced apart from said first stationary sealing flange so as to define an annular buffer cavity therebetween.

* * * * *